US 6,425,743 B1

(12) United States Patent
Fischer

(10) Patent No.: US 6,425,743 B1
(45) Date of Patent: Jul. 30, 2002

(54) INTERNAL COMBUSTION ENGINE SUCTION AIR THROTTLE TURBINE

(75) Inventor: Christian Fischer, Fellbach (DE)

(73) Assignee: Filterwerk Mann & Hummel GmbH, Ludwigsburg (DE)

( * ) Notice: Subject to any disclaimer, the term of this patent is extended or adjusted under 35 U.S.C. 154(b) by 0 days.

(21) Appl. No.: 09/929,484

(22) Filed: Aug. 15, 2001

Related U.S. Application Data

(62) Division of application No. 09/284,203, filed as application No. PCT/EP97/05557 on Oct. 9, 1997, now abandoned.

(30) Foreign Application Priority Data

Oct. 9, 1996 (DE) .......................................... 196 41 555

(51) Int. Cl.$^7$ .......................... F01D 25/16; F01D 25/24; F04B 17/00
(52) U.S. Cl. .................. 417/407; 415/174.2; 415/215.1
(58) Field of Search .......................... 417/407; 415/119, 415/200, 215.1, 174.2; 416/131, 134 R, 500; 384/535, 536

(56) References Cited

U.S. PATENT DOCUMENTS

| | | | | |
|---|---|---|---|---|
| 3,096,614 A | * | 7/1963 | Silver et al. | |
| 3,897,985 A | * | 8/1975 | Davis et al. | 384/536 |
| 4,116,502 A | * | 9/1978 | Horler et al. | 417/407 |
| 4,474,007 A | * | 10/1984 | Kronogard et al. | 417/407 |
| 4,867,655 A | * | 9/1989 | Barbic et al. | 417/407 |
| 4,943,170 A | * | 7/1990 | Aida et al. | 417/407 |
| 5,253,985 A | * | 10/1993 | Ruetz | 417/407 |
| 5,394,848 A | * | 3/1995 | Tsutsumi et al. | |
| 6,149,382 A | * | 11/2000 | Englander et al. | 415/174.2 |

FOREIGN PATENT DOCUMENTS

FR 1396802 * 3/1965 .................. 417/407

* cited by examiner

Primary Examiner—Michael Koczo
(74) Attorney, Agent, or Firm—Crowell & Moring LLP

(57) ABSTRACT

A throttle device for liquid or gaseous media including a turbine which drives a compressor, a pump or a generator, and in which throttling of liquid or gaseous flow occurs by modifying the turbine load state.

18 Claims, 5 Drawing Sheets

INTERNAL COMBUSTION ENGINE SUCTION AIR THROTTLE TURBINE

This application is a division of application Ser. No. 09/284,203, abandoned, which is a 371 of PCT/EP97/05557, filed Oct. 9, 1997.

BACKGROUND OF THE INVENTION

The invention relates to a throttle for liquid or gaseous media, comprised of a turbine which drives a compressor, a pump or a generator.

DE OS 32 05 722 discloses a throttle for gaseous media, namely for the air intake of an internal combustion engine. This makes use of the knowledge that the reduction of the kinetic energy of the flow in the air intake tube, which occurs in load regulation or operation of the load adjusting device, is converted to another form of energy. In this way both the disadvantages of the known throttle valve which comprise an energy loss for the internal combustion engine and the disadvantage of the great structural complexity of the known throttle-less load control or regulation are avoided.

DE OS 32 05 722 discloses a load adjusting apparatus, especially for the internal combustion engine of a motor vehicle. This load adjusting apparatus is an operating machine with means for exchanging kinetic energy between it and the flow in the air intake tube, wherein this operating ads machine is driven by the air flow at least in the partial-load range of the internal combustion engine. The operating machine can, under certain conditions, also operate as a supercharger.

A disadvantage of this system is to be seen in the fact that a bypass line is necessary. The operating machine is arranged in this bypass line. Both in the bypass line and in the main line throttle valves are provided for controlling the distribution of the air. This makes this system expensive and liable to malfunction due to the mechanical components that it additionally requires.

A disadvantage of the disclosed design is also to be seen in the fact that the throttling of the internal combustion engine is performed very sluggishly.

SUMMARY OF THE INVENTION

The invention is therefore addressed to the problem of providing a throttle for liquid or gaseous media, which will have a simple construction and be suitable for a multitude of applications. This object is achieved by a throttling arrangement as as described hereinafter.

The substantial advantage of the invention lies in the fact that the throttling of the liquid or gaseous flow is effected by varying the load state of the turbine.

Through the invention, therefore, the energy which is usually lost at throttle locations, is utilized, namely by a device such as a compressor or a pump, for example, which transforms the energy. For example, with a pump, air can be supplied to a pressure tank. Of course, it is also possible to use the energy made available by the turbine to drive a pump which conveys water, oils or other liquids.

One advantageous embodiment of the invention is that, for example, the energy produced by the turbine can be converted into various forms of energy. Thus it is also possible to convert the energy to thermal energy and to use it for heating or warming a system.

One embodiment of the turbine envisions making it with a bipartite or multipartite casing construction. This is especially advantageous when synthetic resin material is used for the housing; the individual components can be made by injection molding and therefore can be produced at especially low cost.

The turbine can have synthetic resin or metal impellers, and thus the impellers can also be economically manufactured if thermoplastic synthetic resin materials are used.

A further refinement of the invention envisions providing the rotor mountings of the turbine with a resilient construction. Thus the rotor can rotate about the axis of its greatest moment of inertia, and slight imbalances can be compensated. Also, a resilient mounting reduces bearing wear.

An especially advantageous embodiment of the turbine uses unjacketed rotors and a metal shell opposite the rotors is present in a synthetic resin housing. The gap width between the respective rotor and the metal shell can be optimized in the manufacturing process or in the engineering of the design.

An alternative embodiment of the turbine envisions providing the latter with jacketed rotors; labyrinth seals, for example, can be used for sealing relative to the housing.

A supplement to the throttle advantageously comprises, for example, providing a filter for the liquid or gaseous medium at the inflow side or at the outflow side. If the filter is used at the inflow side, it reduces the fouling of the turbine and thereby achieves a longer operating life for the turbine.

These and other features of preferred embodiments of the invention will be found not only in the claims but also in the description and the drawings, it being possible for the individual features to be realized individually or together in the form of subcombinations in embodiments of the invention and in other fields, and can represent advantageous as well as independently patentable embodiments for which protection is hereby claimed.

BRIEF DESCRIPTION OF THE DRAWINGS

The invention will be explained in further detail hereinafter with reference to working examples.

DETAILED DESCRIPTION OF PREFERRED EMBODIMENTS

Figure 1:
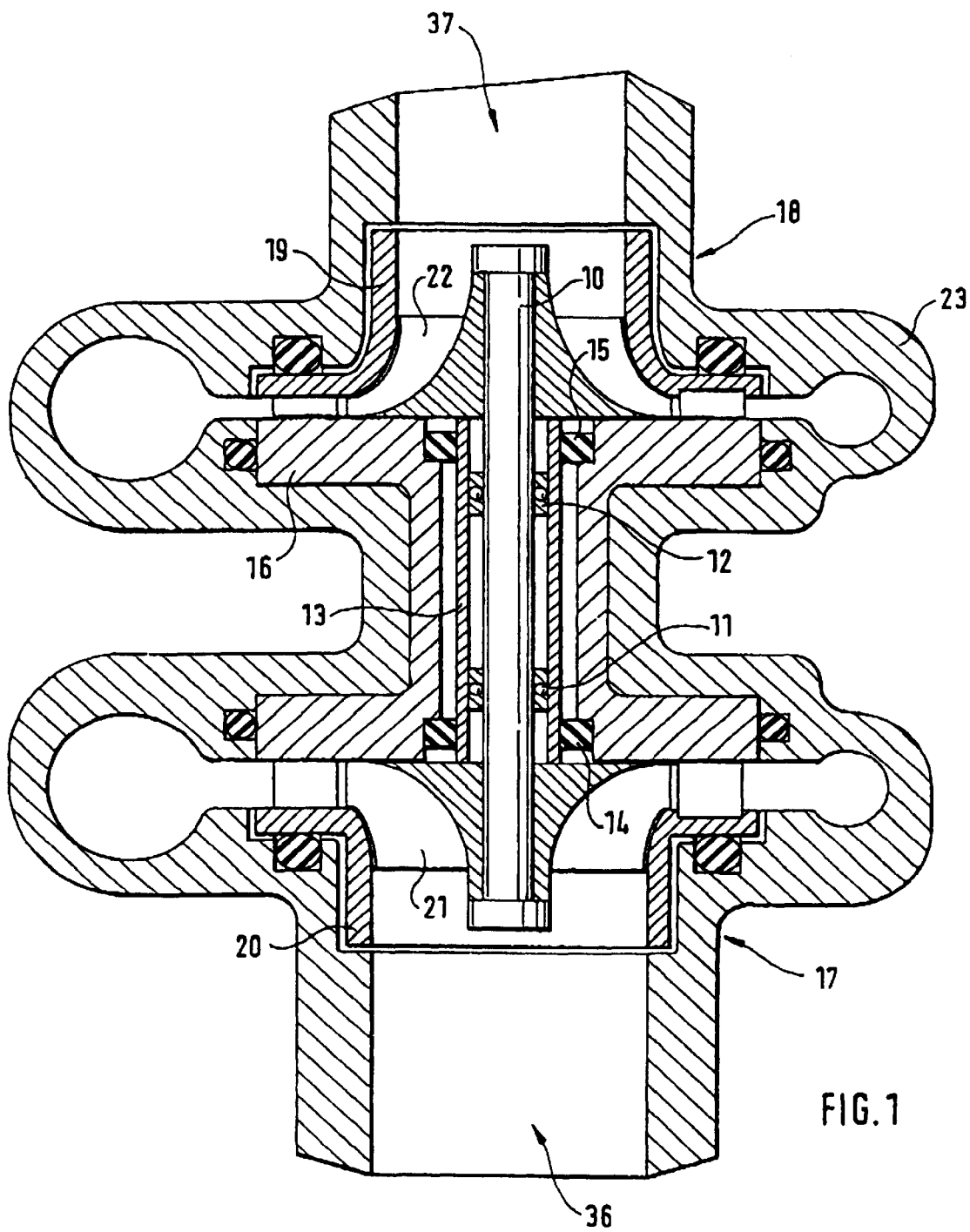
FIG. 1 shows a turbine with a resilient rotor mounting.

In the detail drawing of FIG. 1, a turbine with a resiliently mounted rotor and a coupled pump are shown. The common shaft 10 is conventionally mounted for rotation on two ball bearings 11 and 12 in a mounting sleeve 13. The mounting sleeve has resilient rings 14 and 15 at both of its ends, and these are fixed in corresponding grooves in a support 16. The resilient bedding of the mounting has the advantage that, even with a slight imbalance, the rotor will spin on its inertial axis.

Both at the turbine end 17 and at the pump end 18, metal facings 19 and 20, respectively, are provided, which are molded or embedded or snapped in place. The gap width around the unjacketed rotors 21 and 22 can be set by spacers between the facings 19, 20 and the housing 23.

Figure 2:
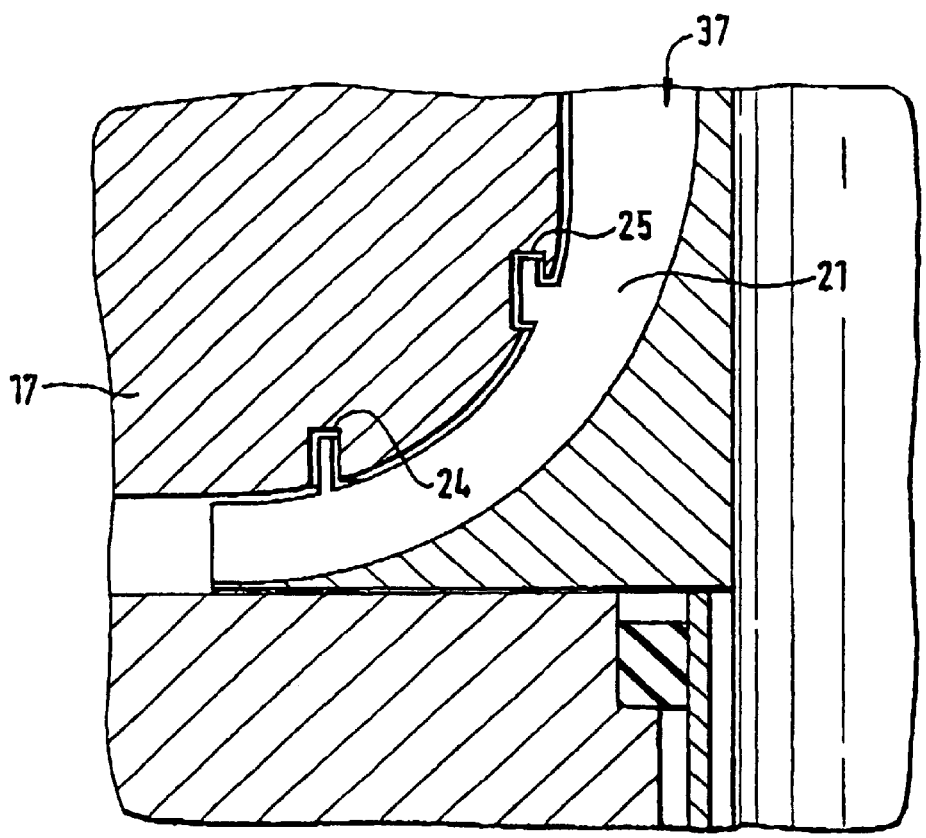
FIG. 2 shows a detail view of a rotor.

It is also possible, however, to use jacketed rotors. In a detail drawing according to FIG. 2, a section of a jacketed rotor is shown. The latter has, in conjunction with the housing, a plurality of labyrinth seal areas 24 and 25; the labyrinth seal is thus partially integrated into the rotor 11.

As already mentioned, the rotor 21 is closed relative to the casing at the turbine end 17; the respective turbine ports 37 are shown in broken lines. The gap between the rotor 21 and the turbine end 17 can, of course, be enlarged by varying the labyrinth seal areas and thereby the seal can be improved.

Figure 3:
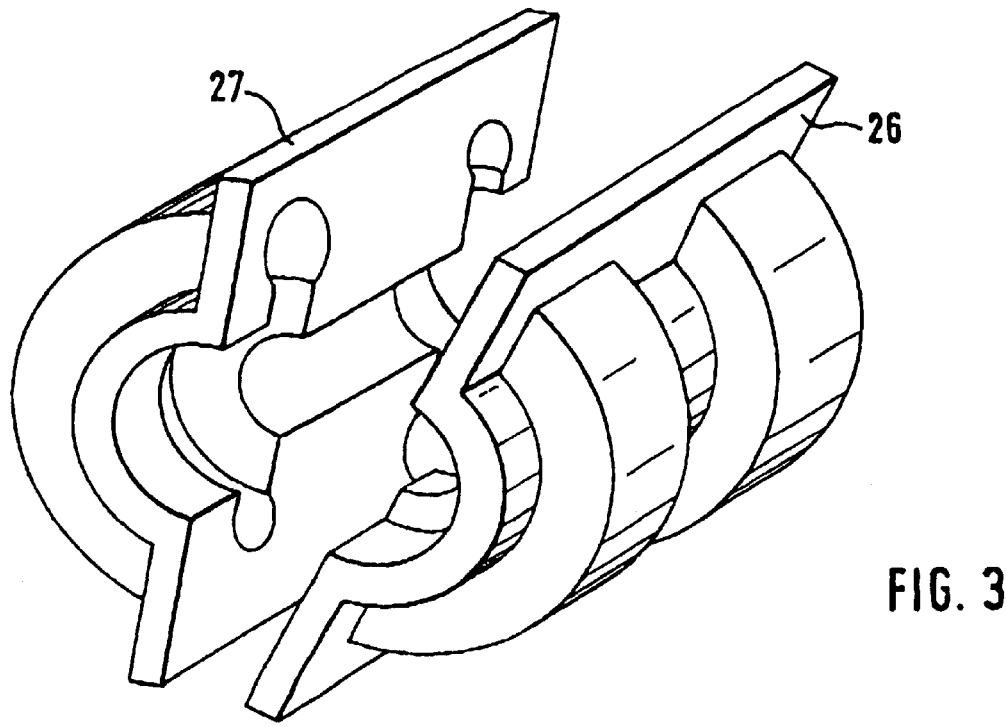
FIG. 3 a bipartite synthetic resin housing.

FIG. 3 shows a synthetic resin housing for a turbine in bipartite form. The two shells 26 and 27 are separated along the turbine axis. The rotor is not shown here; after the two synthetic resin parts are produced, the rotor is assembled in place with its complete bearings, and the synthetic resin parts are welded together by the ultrasound method.

Figure 4:
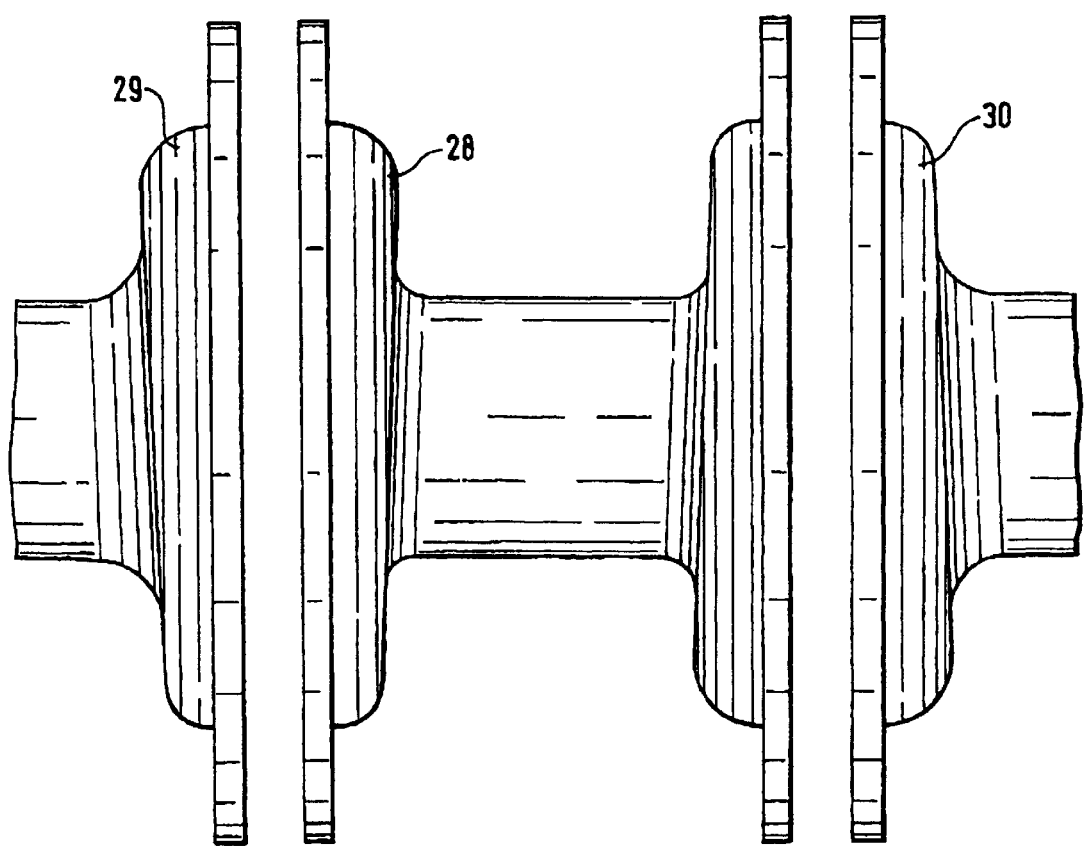
FIG. 4 a variant of a synthetic resin housing.

FIG. 4 likewise shows schematically a synthetic resin housing for a turbine. In this case two parting planes are provided, each of which is located in the area of the rotors. The synthetic resin parts 28, 29 and 30 are likewise welded together by the ultrasound method after the rotors and the bearings have been inserted into the middle component 28.

Figure 5:
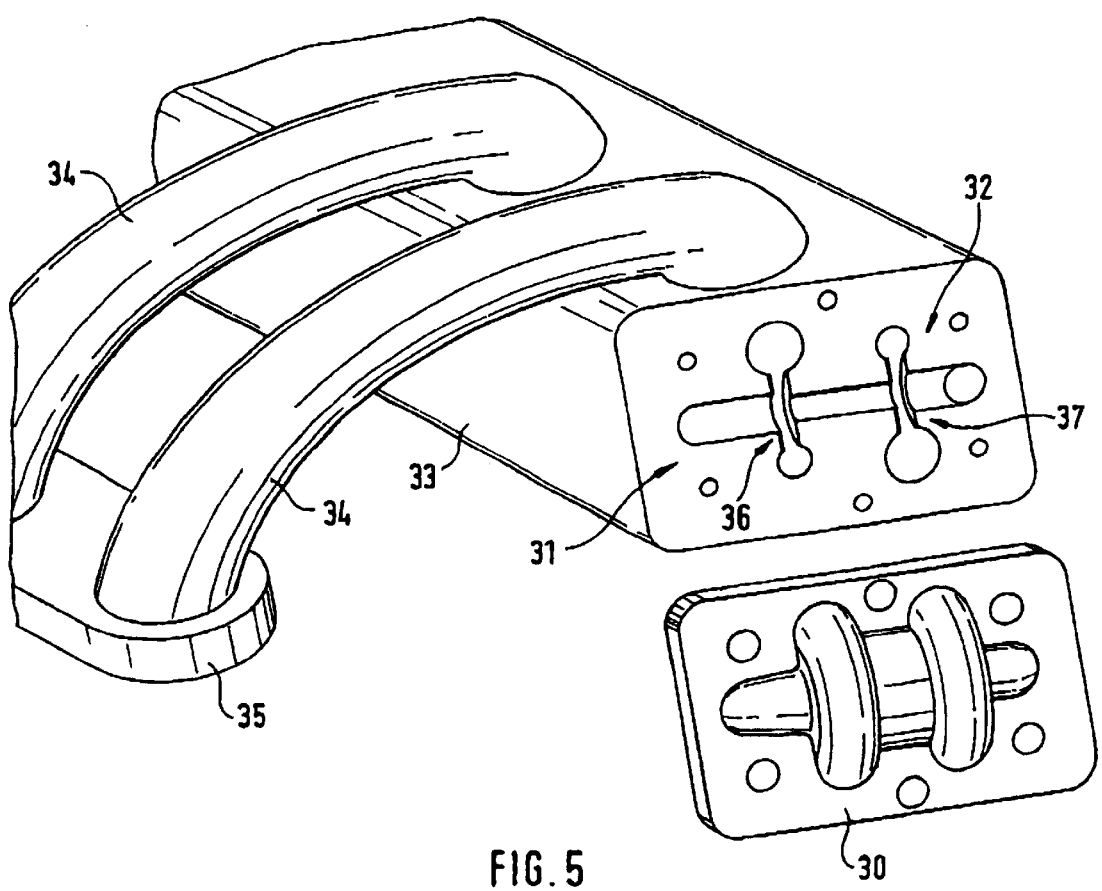
FIG. 5 an air intake system with turbine.

FIG. 5 shows the arrangement of a throttle or turbine on an air intake system of an internal combustion engine. The air intake system comprises a manifold 33 from which one or more intake tubes 34 lead to a connecting flange 35. This connecting flange 35 is affixed to an internal combustion engine. Instead of or in addition to the throttle valve for controlling the supply of air to the internal combustion engine, the throttle is provided in the form of a turbine. The air taken in by the internal combustion engine is fed to this turbine at the intake end 36; this air drives the turbine due to the pressure drop between the ambient pressure and the subatmospheric pressure in the intake. At the compressor end 37 compressed air is produced which can be made available to the vehicle system. The construction-of the turbine is similar to that shown in FIG. 3, wherein a housing end 32 is formed by the end face 31 of the air intake system. After insertion of the rotors and bearings, the second housing shell 30 is bolted or welded to end face 31. Here, again, an ultrasound welding process can be employed if a thermoplastic synthetic resin material is used.

Figure 6:
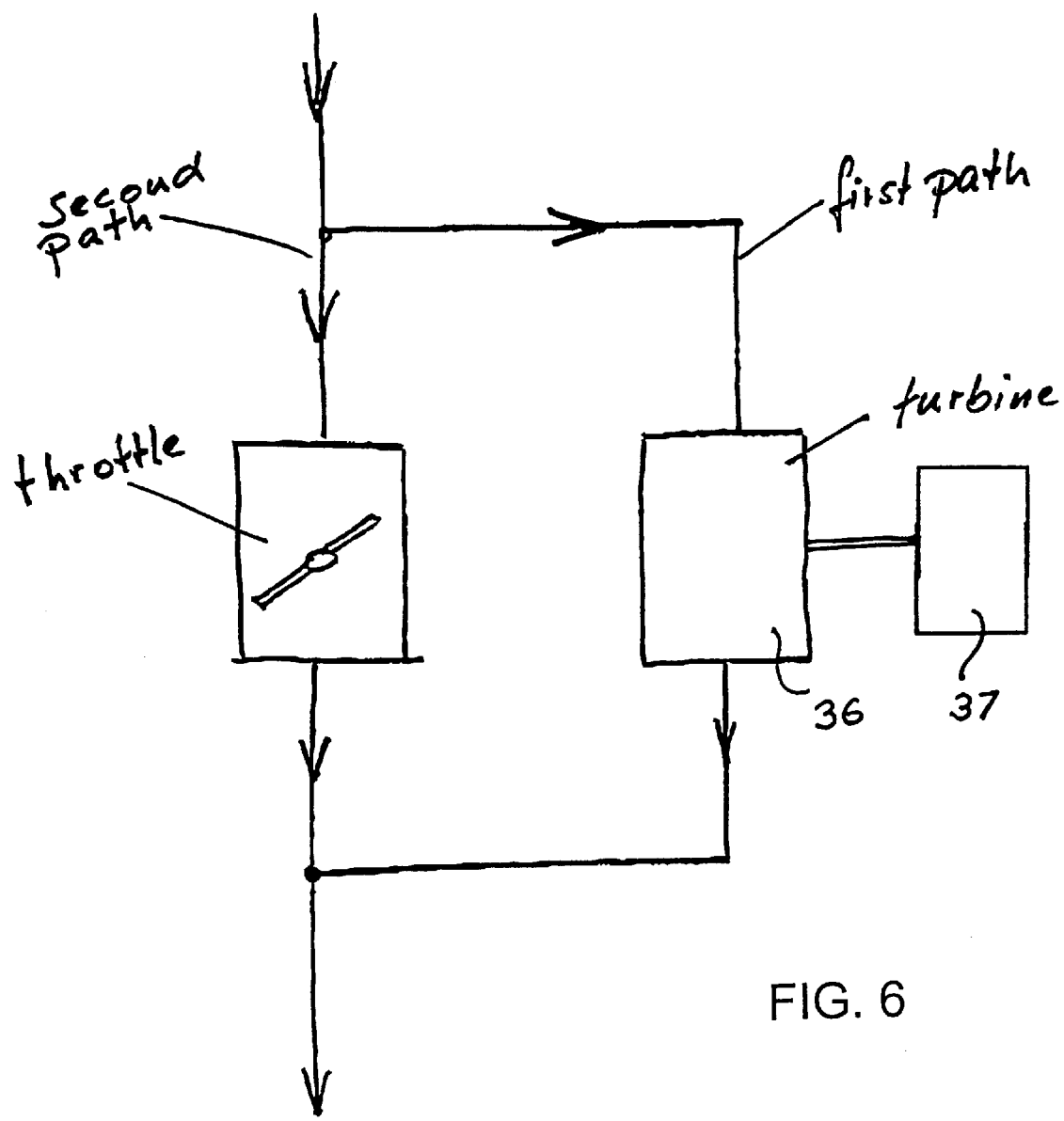
FIG. 6 a schematic diagram of the throttle arrangement according to the invention.

FIG. 6 shows a throttle for liquid or gaseous media with a turbine 36 which is arranged in parallel with a throttle and which drives a load such as a compressor 37. The load might also be a pump or an electric generator. In this arrangement, the flow of the parallel stream in which the turbine is disposed can be controlled by regulating the load state of the turbine.

What is claimed is:

1. A throttle arrangement for regulating flow of a fluid medium through a flow channel, said throttle arrangement comprising a turbine interposed in said flow channel such that the turbine is driven by fluid medium flowing through said channel; said turbine being connected to drive a load and comprising a rotor mounted via ball bearings in a mounting sleeve which is resiliently supported at its ends in a support member by resilient annular rings; wherein the flow of fluid medium through said channel is throttled by regulating the load state of the turbine.

2. A throttle arrangement according to claim 1, wherein said load driven by said turbine is a compressor.

3. A throttle arrangement according to claim 1, wherein said load driven by said turbine is a pump.

4. A throttle arrangement according to claim 1, wherein said load driven by said turbine is an electrical generator.

5. A throttle arrangement according to claim 1, wherein said turbine is arranged in a first parallel flow path and a throttle valve is arranged in a second parallel flow path, and wherein flow of fluid medium through said first parallel flow path is controlled by varying the load state of the turbine.

6. A throttle arrangement according to claim 1, further comprising an energy accumulator connected to said load, wherein energy from the flow of fluid medium is accumulated for later use.

7. A throttle arrangement according to claim 6, wherein said load comprises an electrical generator, and said energy accumulator comprises a storage battery in which electricity produced by said generator can be stored.

8. A throttle arrangement according to claim 4, wherein said load comprises a compressor, and said energy accumulator comprises a pressure tank in which pressurized fluid compressed by said compressor can be stored.

9. A throttle arrangement according to claim 1, wherein said turbine is contained in a multi-part housing of metal or synthetic resin material.

10. A throttle arrangement according to claim 9, wherein said housing is formed of synthetic resin parts joined together by ultrasonic welding.

11. A throttle arrangement according to claim 10, wherein said housing is formed of two synthetic resin shells joined along a plane extending parallel to the turbine axis.

12. A throttle arrangement according to claim 10, wherein said housing comprises three synthetic resin housing parts joined in planes extending perpendicular to the turbine axis.

13. A throttle arrangement according to claim 9, wherein said turbine comprises a rotor with rotor vanes formed of synthetic resin material.

14. A throttle arrangement according to claim 13, wherein said turbine comprises an unjacketed rotor and a metal facing confronting the periphery of the rotor.

15. A throttle arrangement according to claim 14, wherein said rotor periphery and said metal facing are spaced apart a gap distance which is adjustable by means of spacers on which said metal facing is mounted.

16. A throttle arrangement according to claim 13, wherein said turbine comprises a jacketed rotor, the jacket of said rotor being sealed relative to said housing by at least one labyrinth seal.

17. A throttle arrangement according to claim 1, further comprising a filter arranged on said flow channel to filter fluid medium flowing through said channel.

18. A throttle arrangement according to claim 17, wherein said filter is arranged on an inflow end of said flow channel upstream of said turbine.

* * * * *